June 22, 1943.    J. R. STRICKLEN    2,322,483
METHOD FOR MANUFACTURING INSULATED WIRE
Filed Sept. 7, 1940
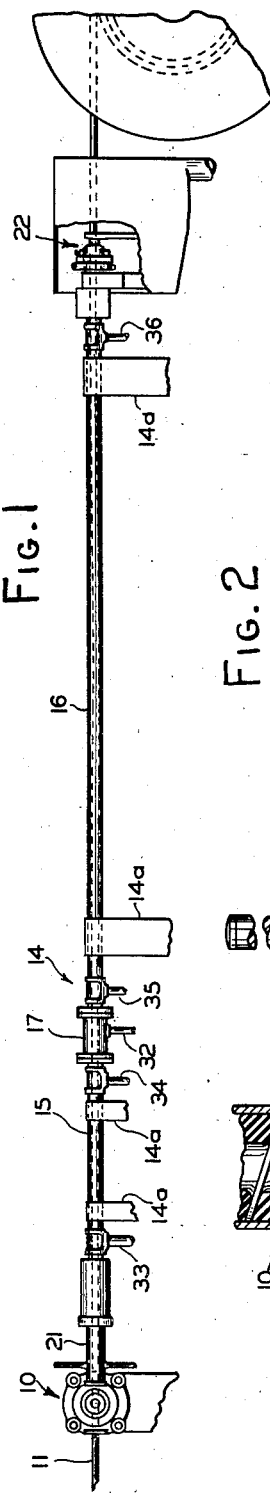
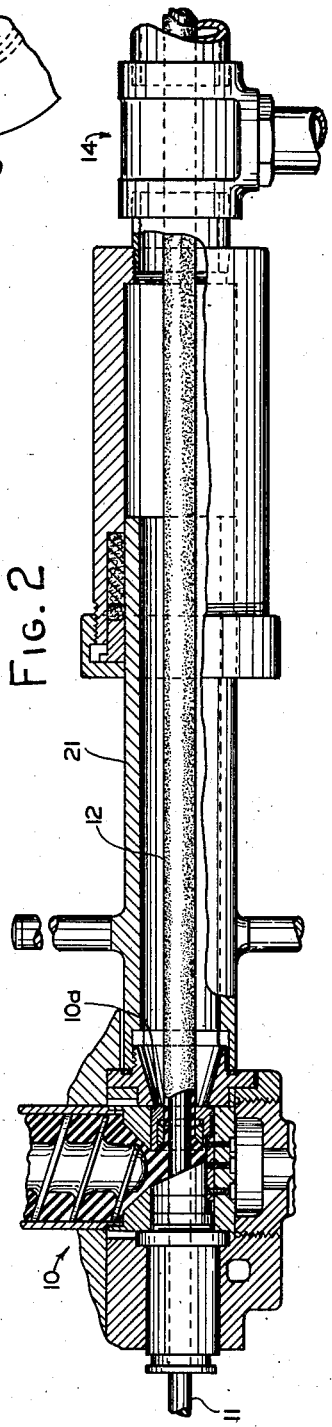
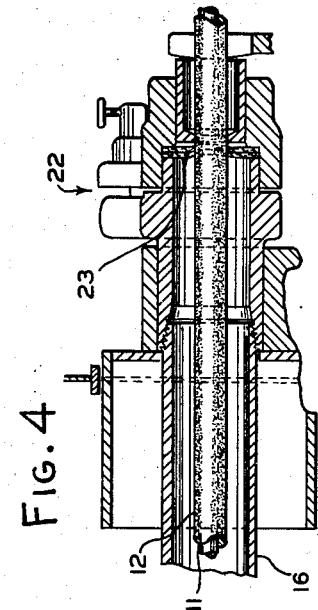
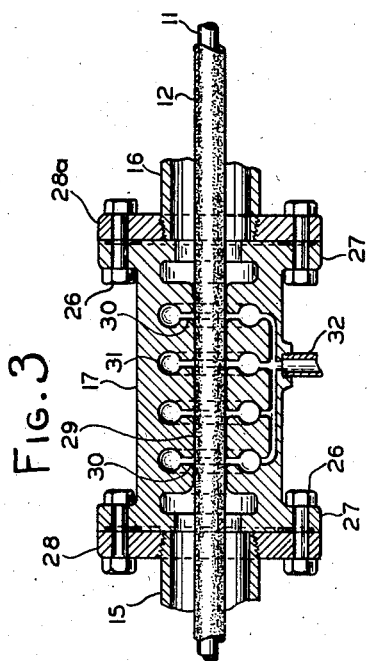
INVENTOR.
JOHN R. STRICKLEN
BY
J. Ralph Barrow Patented June 22, 1943

2,322,483

UNITED STATES PATENT OFFICE 2,322,483

METHOD FOR MANUFACTURING INSULATED WIRE

John R. Stricklen, Akron, Ohio, assignor to National Rubber Machinery Company, Akron, Ohio, a corporation of Ohio Application September 7, 1940, Serial No. 355,794

4 Claims. (Cl. 18—53)

This invention relates to methods for coating wire or like continuous cores with rubber or similar vulcanizable material, as for example, for use in the manufacture of insulated wire or cable.

Heretofore, wire has been provided with insulating coatings of rubber by extruding the rubber onto the wire and continuously feeding the coated wire through a straight tubular vulcanizer. This method, however, has been found not to be satisfactory for manufacturing heavy insulated cable or wire, because the length of unsupported cable within the vulcanizer for completely curing the insulated coating necessarily has been such that the cable sagged and, unless the vulcanizer was enlarged to an extent which would be uneconomical, this sagging cable dragged along the bottom of the vulcanizer, whereby the rubber coating became chafed and torn. To obviate this difficulty in the past one practice has been to coat heavy gauge cable by winding the unvulcanized coated cable on a reel, and then placing the reel in an open vulcanizing chamber. The latter method, however, is also objectionable in that the finished cable has a tendency to retain a coiled shape, due to the inherent resiliency of the vulcanized rubber coating thereon, and thereby presents many difficulties in handling the cable. As for example, loops formed in such cable while it was being handled by workmen, these loops frequently becoming tangled with objects to hinder or endanger the workmen.

An object of this invention is to provide a simple, efficient, and economical method for manufacturing heavy gauge insulated wire, cable, or like continuous core, in which the finished product will have substantially no inherent tendency to coil.

Another object of the invention is to provide a method for vulcanizing rubber coated wire or like continuous core in a straight, continuous vulcanizer without chafing, tearing or otherwise blemishing the rubber as the core passes through the vulcanizer.

These and other objects of the invention will be manifest from the following brief description and the accompanying drawing.

Of the accompanying drawing:

Figure 1 is a side elevation of apparatus embodying the invention.

Figure 2 is an enlarged detail view, partly in vertical cross-section, illustrating the fluid sealing connection between the vulcanizer and extruder in said apparatus.

Figure 3 is an enlarged vertical cross-section, of the zone separator in the vulcanizer.

Figure 4 is an enlarged vertical cross-section of the fluid-sealing connection at the outlet end of the vulcanizer.

Referring to the drawing, the numeral 10 designates a continuous extruder, of known type used in the rubber industry, into which a cable, wire, or like continuous core 11, from a suitable source of supply (not shown) is progressively fed, to receive a coating 12 of rubber or like vulcanizable material thereon.

From the extruder 10 the coated cable 11 is progressively fed through a horizontally extending vulcanizer 14, which may include a short tube 15 and a relatively longer tube 16, connected to each other by a separator 17, which separates the vulcanizer into two zones or chambers within the respective tubes. Tubes 15 and 16 are mounted on suitable supports 14ᵃ, 14ᵃ. The various parts of the vulcanizer may be heat insulated in any suitable manner (not shown).

The end of the vulcanizer adjacent the extrusion opening 10ᵃ of the extruder may be connected to the extruder, in fluid sealing relation, as by means of a releasable splicing connector 21, in the manner illustrated in Figure 2. The type of connector suitable for this purpose is fully described in copending application, Serial No. 245,592. The end of the long tube 16 remote from the extruder may have mounted thereon a fluid-sealing device 22 of the type shown in Figure 4, the same being provided with a flexible diaphragm 23 having an aperture through which the coated cable passes.

The zone separator 17 may be connected between the tubes 15 and 16, by means of bolts 26, 26 extended through lugs or flanges 27, 27, on the ends of the separator to bolt the same to flanges 28, 28ᵃ threaded on the ends of tubes 15 and 16, respectively. Separator 17 is provided with a central passage 29 of such diameter as to permit free passage of the coated cable 11 therethrough, but allowing a minimum of the vulcanizing medium, such as steam to pass from one tube to the other. The separator 17 may be provided with a series of longitudinally spaced annular grooves 30, 30, each communicating the central passage 29 with annular chambers 31, 31 the bottoms of which in turn communicate with a bleeder pipe 32 connecting with a drain (not shown). This divides the vulcanizer into a high pressure or high temperature zone in tube 15, and a low pressure or low temperature zone in the longer tube 16. Steam in escaping from the high pressure zone will pass through the grooves 30 before reaching low pressure zone, this escaped steam condensing in the chambers 31, and passing into bleeder pipe 32. A requisite number of grooves 30 may be provided in accordance with the steam pressures or temperatures in the tubes 15 and 16, and so that the temperature reduction along the zone separator will be gradual.

Steam may be supplied to tube 15, through piping 33, 34 from a suitable source of supply (not shown), at such a relatively high pressure or temperature in accordance with the length of said tube and the speed of travel of the coated cable, quickly to cure a hardened surface or skin on said coating. The tube 15 is of such relatively short length that the weight of cable passing therethrough will not cause the cable to sag a sufficient amount to drag along the bottom of the tube, and thereby chafe or tear the soft rubber coating.

Piping 35, 36, from a suitable source of steam supply (not shown), supplies steam to tube 16 at a pressure or temperature relatively lower than that in tube 15, in accordance with the longer length of tube 16, so that the rubber coating on the cable will be completely vulcanized during longer periods of time found to be desirable for best results.

The cable with the rubber coating vulcanized thereon, upon passing through the sealing device 22 on the end of tube 16, is wound upon a reel 35, rotated by suitable driving means (not shown), this driving means comprising at least in part the mechanism for drawing or feeding the cable through the extruder and the vulcanizer.

In the operation of the apparatus, the heavy cable 11 is progressively fed through the extruder 10 to receive a continuous coating of unvulcanized rubber thereon. Upon the cable passing from the extruder into the short tube 15, this rubber coating is subjected to the high pressure steam therein, the period of exposure of any portion of the coating being comparatively short, whereby said coating will have quickly formed thereon, by partial vulcanization, a thin, hard surface or skin. The cable continues past the zone separator 17, on into the low pressure zone in tube 16, in which zone the hard surface or skin will protect the rubber coating against chafing or tearing by reason of the relatively long lengths of cable in the tube tending to sag and thereby drag on the bottom thereof. The cable then passes from the vulcanizer to be wound on reel 35, as described above.

It will be readily understood by those skilled in the art that the use of the method and apparatus described above need not be limited to the manufacture of insulated wire, but may be similarly utilized for continuous vulcanization of any type of continuous material which would present the problem of relatively long lengths thereof sagging to such an extent as to become damaged by dragging along the bottom of the vulcanizing chamber.

Modifications of the invention may be resorted to without departing from the spirit thereof or the scope of the appended claims.

What is claimed is:

1. The method of manufacturing insulated wire or the like which comprises progressively feeding a continuous core coated with vulcanizable material through a vulcanizing zone maintained at sufficiently high temperature to form a hardened surface or skin on said coating, and passing said core through a second zone maintained at a relatively lower vulcanizing temperature than said first zone to complete the vulcanization of said coating.

2. The method of manufacturing insulated wire or the like which comprises progressively feeding a continuous core coated with vulcanizable material through a relatively short vulcanizing zone maintained at a relatively high temperature to cure hardened surface or skin on said coating, and feeding the core through a relatively long second vulcanizing zone maintained at a relatively lower temperature to complete the vulcanization of said coating.

3. A method of manufacturing continuous, flexible, vulcanizable material, which comprises feeding the material through a relatively short vulcanizing zone maintained at relatively high temperature to cure a hardened surface or skin on the material, and then feeding the material through a relatively longer vulcanizing zone maintained at relatively lower temperature to complete the vulcanization of the material.

4. That method for vulcanizing continuous flexible vulcanizable material which comprises feeding the material through a zone in which is a vulcanizing medium adapted to cure a hardened surface or skin on the material, the material being supported in said zone so as to prevent substantial sagging thereof, and then feeding the material through a second zone in which is a vulcanizing medium for completing the vulcanization of the material and in which the material is permitted to sag.

JOHN R. STRICKLEN.